US006502651B2

(12) United States Patent
Zaczkowski et al.

(10) Patent No.: US 6,502,651 B2
(45) Date of Patent: *Jan. 7, 2003

(54) SUSPENSION MECHANISM FOR A SNOWMOBILE

(76) Inventors: Jeffrey T. Zaczkowski, 4365 Flowerfield Rd., Circle Pines, MN (US) 55014; Anthony A. LaMotte, 6497 12th Ave. S., Hugo, MN (US) 55038

(*) Notice: Subject to any disclaimer, the term of this patent is extended or adjusted under 35 U.S.C. 154(b) by 0 days.

This patent is subject to a terminal disclaimer.

(21) Appl. No.: 10/067,004

(22) Filed: Feb. 4, 2002

(65) Prior Publication Data

US 2002/0088652 A1 Jul. 11, 2002

Related U.S. Application Data

(63) Continuation of application No. 09/566,559, filed on May 8, 2000, now Pat. No. 6,354,389.

(51) Int. Cl.$^7$ ............................................. B62D 55/00
(52) U.S. Cl. ............ 180/9.54; 180/193; 280/124.158
(58) Field of Search ................... 180/190, 193, 180/9.5, 9.54; 280/124.158; 267/256, 64.27, 64.28

(56) References Cited

U.S. PATENT DOCUMENTS

| | | | | | |
|---|---|---|---|---|---|
| 3,863,727 A | * | 2/1975 | Michrina | ...................... | 180/193 |
| 3,931,861 A | * | 1/1976 | Olson | ........................ | 180/193 |
| 4,899,995 A | * | 2/1990 | Hoffman et al. | ......... | 267/64.27 |
| 4,923,210 A | * | 5/1990 | Heider et al. | ............... | 280/707 |
| 5,004,206 A | * | 4/1991 | Anderson | ................... | 248/585 |
| 5,273,126 A | * | 12/1993 | Reed et al. | ................ | 180/9.21 |
| 5,409,075 A | * | 4/1995 | Nieman | ....................... | 180/9.5 |
| 5,651,585 A | * | 7/1997 | Van Duser | ............. | 297/344.16 |
| 5,664,649 A | * | 9/1997 | Thompson et al. | ......... | 188/314 |
| 5,667,031 A | * | 9/1997 | Karpik | ...................... | 180/190 |
| 5,707,045 A | * | 1/1998 | Easter | ...................... | 267/64.21 |
| 5,904,217 A | * | 5/1999 | Yamamoto et al. | ......... | 180/193 |
| 5,944,134 A | * | 8/1999 | Peppel et al. | ............... | 180/193 |
| 6,199,820 B1 | * | 3/2001 | Ritchie | ....................... | 248/421 |
| 6,354,389 B1 | * | 3/2002 | Zaczkowski et al | ....... | 180/9.54 |

FOREIGN PATENT DOCUMENTS

| | | | | |
|---|---|---|---|---|
| CA | 002067409 A1 | * 10/1992 | ................. | 180/190 |
| JP | 0157283 | * 7/1991 | ................. | 180/190 |

OTHER PUBLICATIONS

Air Ride Technologies, 1999–2000 Catalog & Technical Manual, pp 1–40.

Truck Super Store, AIM Catalog, Dec. 1999, cat#1newdec99—cat#6newdec99.

* cited by examiner

*Primary Examiner*—Daniel G. DePumpo
*Assistant Examiner*—Daniel Yeagley
(74) *Attorney, Agent, or Firm*—Crompton, Seager & Tufte LLC (57) ABSTRACT

Devices and methods for suspending a vehicle are disclosed. A suspension mechanism in accordance with the present invention includes a suspension arm having a first end and a second end, a swing arm having a first end pivotably coupled to the first end of the suspension arm and a second end pivotably coupled to a slide frame, a pivot arm having a first end pivotably coupled to the suspension arm proximate the second end thereof, the pivot arm further including a pivot axle and a second end, the second end of the pivot arm being pivotably coupled to the slide frame, a cradle pivotably coupled to the suspension arm between the first end and the second end thereof, an air spring having a first end seating against the cradle and a second end seating against a seating portion of the slide frame.

14 Claims, 10 Drawing Sheets

SUSPENSION MECHANISM FOR A SNOWMOBILE

This is a continuation of U.S. patent application Ser. No. 09/566,559 filed on May 8, 2000, and issued U.S. Pat. No. 6,354,389 on Mar. 12, 2002.

FIELD OF THE INVENTION

The present invention relates generally to suspension mechanisms for vehicles. More particularly, the present invention relates to suspension mechanisms utilized in snowmobile suspensions.

BACKGROUND OF THE INVENTION

Snowmobiling is a popular recreational activity in areas which receive snow during the winter. Local trail systems have been developed in areas in which snowmobiling is popular. It is not uncommon for a snowmobiler to cover one hundred (100) miles in a single outing. Unfortunately, it is also not uncommon for snowmobile trails to be in rough condition due to the volume of snowmobile traffic on weekends and other times when a large number of snowmobilers are using the trail. The trail conditions encountered by a snowmobiler can vary from a freshly groomed trail to sections of small washboard bumps to sections of very large bumps. The snowmobiler may also cross roads, cross icy lakes, or venture off the trail into powder snow all in a single excursion.

In order to fully enjoy the sport of snowmobiling, snowmobilers require a snowmobile suspension which gives them good ride quality and good control of the snowmobile. Ideally, this suspension mechanism should be adjustable to accommodate changing trail conditions. Because snowmobile suspension mechanisms are subjected to repeated shocks and intense vibration along with exposure to water, ice, snow, salt and dirt, it is important that snowmobile suspension mechanisms be very durable.

SUMMARY OF THE INVENTION

The present invention relates generally to suspension mechanisms for vehicles. More particularly, the present invention relates to suspension mechanisms utilized in snowmobile suspensions.

A suspension mechanism for a snowmobile comprising a pair of elongated side rails connected together by a plurality of supports to define a slide frame. A rear suspension mechanism is attached to the slide frame which includes an air spring. The air spring having a first end and second end, the first end of said air spring being pivotally connected to the chassis of the snowmobile. A cradle pivotally connected to the slide frame. The second end of the air spring mounted in the cradle. The cradle is designed such that the pivot point of the cradle is located below the point at which the air spring is connected to the cradle. This mounting structure allows the cradle to rotate to accommodate changes in the angular orientation of the air spring.

A snowmobile in accordance with the present invention includes a seat to accommodate a snowmobile operator, a steering arrangement, and a control panel. In a presently preferred embodiment, both the steering arrangement and the control panel are located where they will be easily accessible to the snowmobile operator. The major components of snowmobile include; a pair of skis each having a ski suspension mechanism, a hood, a track, a chassis, and a rear suspension.

In a presently preferred embodiment, the rear suspension includes a slide frame, which supports the track along its length. The slide frame includes a left slide and a right slide which are connected by a plurality of cross members. The left slide and the right slide are also connected by a rear axle which supports a plurality of idler wheels. A plurality of bogie wheels may also be pivotably attached to slide frame.

In a presently preferred embodiment, one or more suspension mechanisms are coupled to the slide frame. A suspension mechanism in accordance with the present invention comprises a suspension arm which is adapted to be pivotably coupled to the chassis of a snowmobile proximate a first end of the suspension arm. The suspension mechanism may also include at least one arm having a first end which is pivotably coupled to the first end of the suspension arm. A second end of the at least one swing arm is pivotably coupled to the slide frame. A pivot arm having a first end may be pivotably coupled to the suspension arm proximate a second end thereof. In a presently preferred embodiment, the pivot arm includes a pivot axle and a second end. The second end of pivot arm is pivotably coupled to the slide frame.

The suspension mechanism also includes an air spring having a first end and a second end. The first end of air spring is seated against a cradle which is pivotably coupled to the suspension arm. The second end of the air spring is seated against a seating portion of the slide frame. In a presently preferred embodiment, a cradle axle is fixed to cradle.

The suspension mechanism may also include a first arm and a second arm. The first arm being fixed to cradle axle and the second arm being fixed to pivot axle. A link having a first end and a second end is disposed between the first arm and the second arm. In a presently preferred embodiment, the first end of the link is pivotably coupled to the first arm and the second end of link is pivotably coupled to the second arm.

In a presently preferred embodiment, the first arm, the second arm, and the link cooperate to assure that the first end of the air spring remains generally parallel to the second end of air spring. This mechanism assures that the air spring will be loaded along it's longitudinal axis. This arrangement also dramatically reduces the likelihood that the air spring will buckle.

In a presently preferred embodiment, the air spring serves to support at least some of the weight of the snowmobile. When the snowmobile encounters a bump air spring may deflect. The spring and a shock absorber may act to dampen the movement of the suspension mechanism. In a method in accordance with the present invention, the stiffness of the suspension mechanism may be adjusted by raising or lower the pressure of the fluid in the chamber of air spring.

A suspension system in accordance with the present invention may include a means for adjusting the pressure inside the chamber of the air spring. One embodiment of a suspension system in accordance with the present invention includes a front suspension mechanism having a front air spring and a rear suspension mechanism a having a rear air spring. The snowmobile operator may actuate one or more switches to selectively adjust the pressure in the chambers of the front and rear air springs to vary the stiffness of the front and rear suspension mechanisms.

DETAILED DESCRIPTION OF THE INVENTION

The following detailed description should be read with reference to the drawings, in which like elements in different drawings are numbered in like fashion. The drawings which are not necessarily to scale, depict selected embodiments and are not intended to limit the scope of the invention. Examples of constructions, materials, dimensions, and manufacturing processes are provided for various elements. Those skilled in the art will recognize that many of the examples provided have suitable alternatives which may be utilized.

Figure 1:
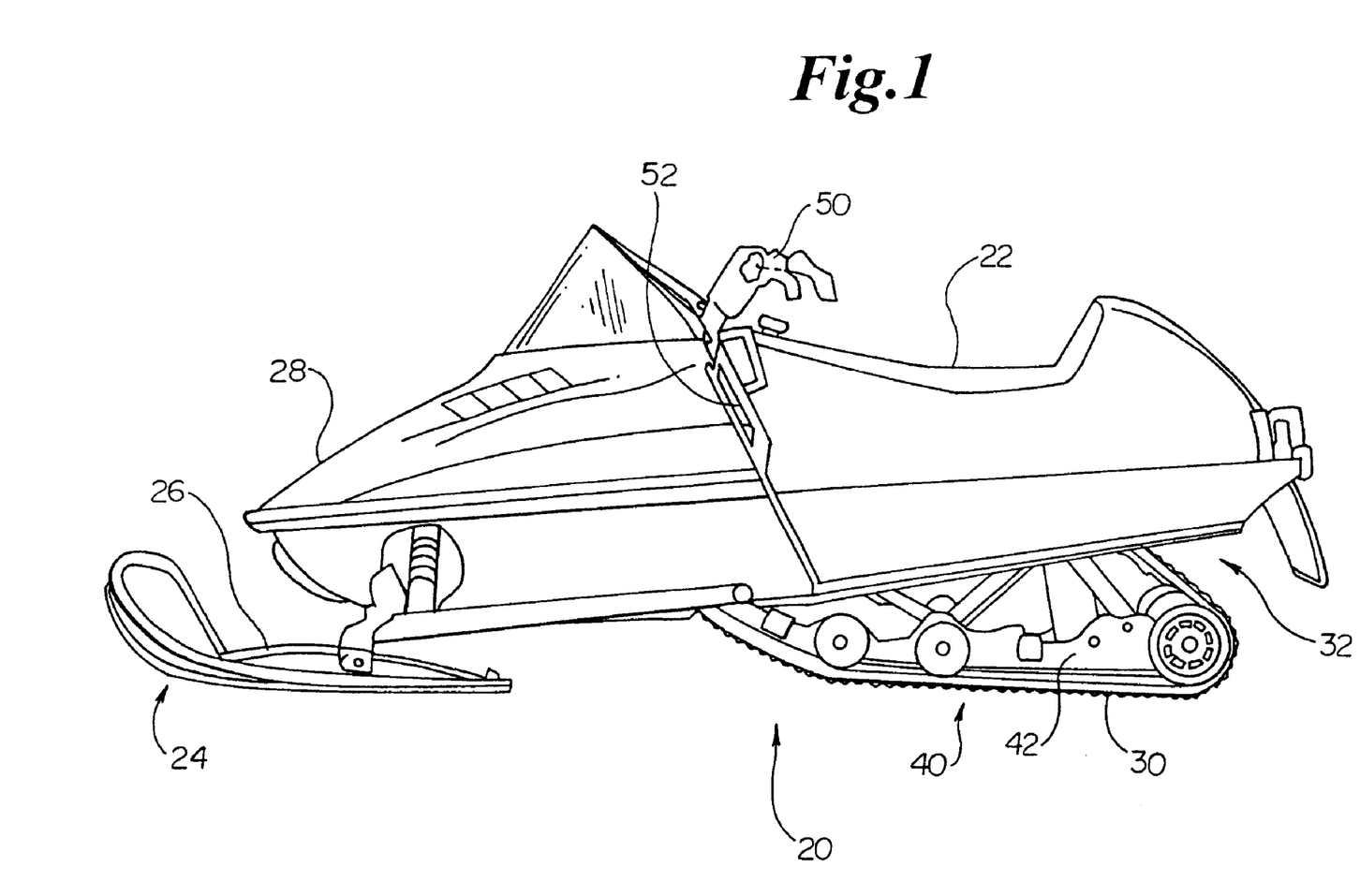
FIG. 1 is a perspective view of a snowmobile.

FIG. 1 illustrates a snowmobile 20 having a seat 22 to accommodate a snowmobile operator (not shown). The major components of snowmobile 20 include; a pair of skis 24, a ski suspension mechanism 26, a hood 28, a track 30, a chassis 32, and a rear suspension 40. An engine 44 (not shown) and a twelve Volt battery 46 (not shown) are housed beneath hood 48. Snowmobile 20 also includes a steering arrangement 50 and a control panel 52. Both steering arrangement 50 and control panel 52 contain a plurality of controls (not shown) used by the snowmobile operator (not shown) to operate snowmobile 20. Rear suspension 40 includes a slide frame 42, which supports track 30 along its length.

Figure 2:
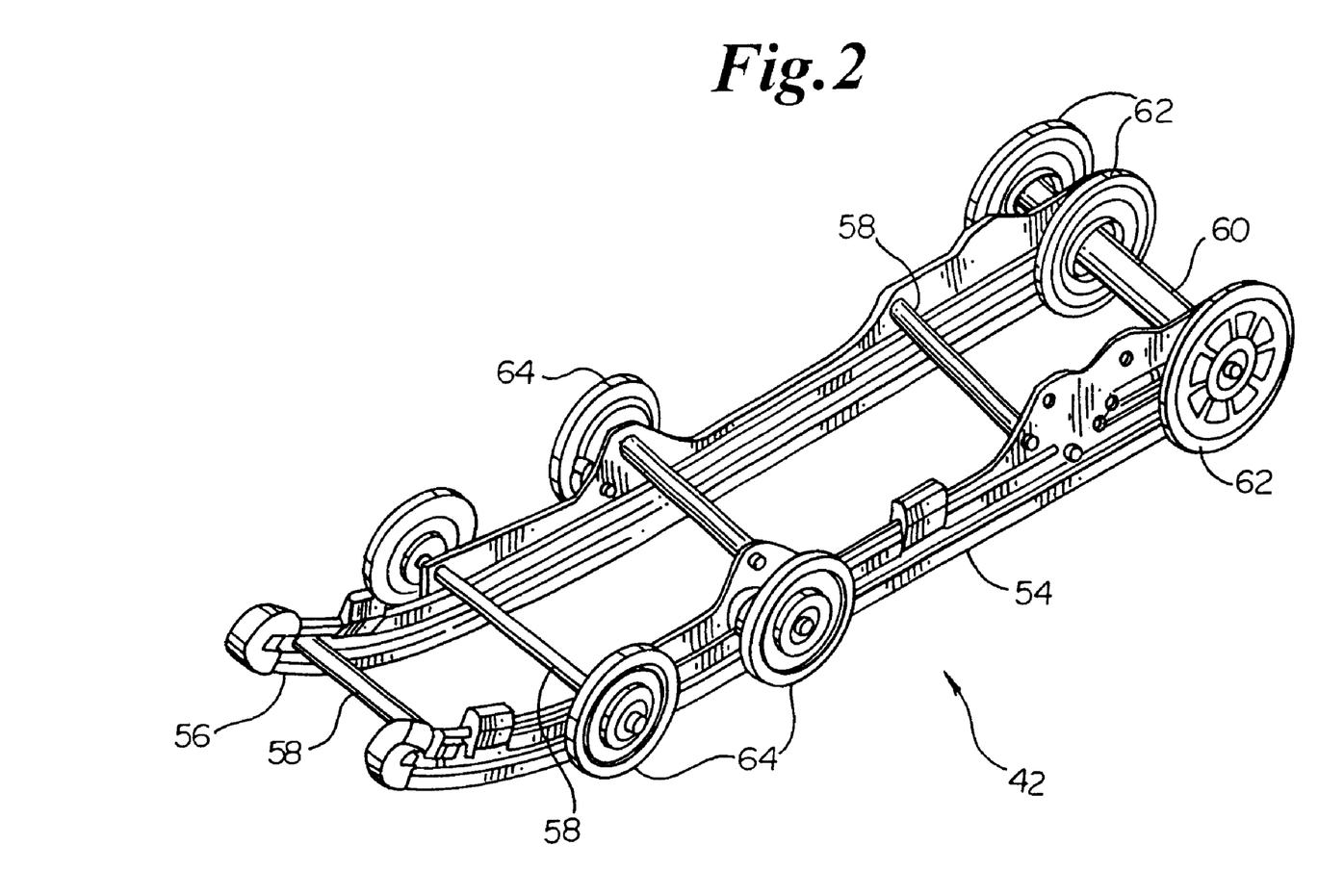
FIG. 2 is a perspective view of a slide frame.

FIG. 2 is a perspective view of a slide frame 42. Slide frame 42 includes a left slide 54 and a right slide 56 which are connected by a plurality of cross members 58. Left slide 54 and right slide 56 are also connected by a rear axle 60 which supports a plurality of idler wheels 62. A plurality of bogie wheels 64 are pivotably attached to slide frame 42.

Figure 3:
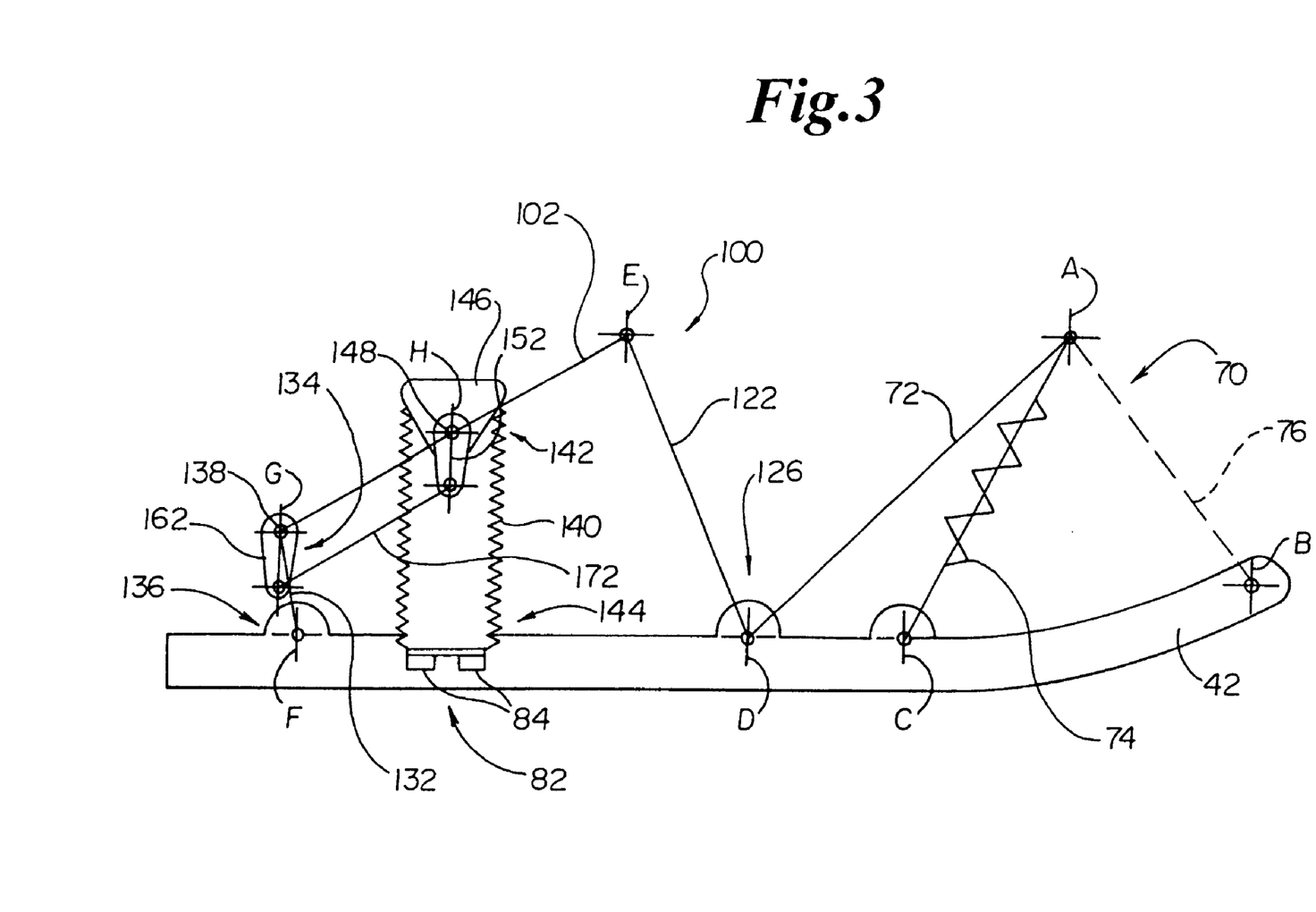
FIG. 3 is a schematic representation of a snowmobile suspension mechanism.

FIG. 3 is a schematic representation of a rear suspension 40 of snowmobile 20. The major components of rear suspension 40 are slide frame 42, a first suspension mechanism 70, and a second suspension mechanism 100.

First suspension mechanism 70 includes front suspension arm 72, spring assembly 74, and a pair of travel limiting straps 76. Front suspension arm 72 is pivotably connected to slide frame 42 at pivot point D. Front suspension arm 72 is also pivotably connected to chassis 32 of snowmobile 20 at pivot point A. Spring assembly 74 is pivotably connected to slide frame 42 at pivot point C, and pivotably connected to front suspension arm 72 at pivot point A. Travel limiting straps 76 are pivotably connected to slide frame 42 at pivot point B and pivotably connected to front suspension arm 72 at pivot point A.

Second suspension mechanism 100 comprises a second suspension arm 102 which is adapted to be pivotably coupled to chassis 32 of snowmobile 20 at pivot point E. A swing arm 122 is pivotably coupled to suspension arm 102 at a pivot point E. A second end 126 of swing arm 122 is pivotably coupled to slide frame 42 at a pivot point D. A pivot arm 132 having a first end 134 is pivotably coupled to second suspension arm 102 at a pivot point G. A second end 136 of pivot arm 132 is pivotably coupled to slide frame 42 at pivot point F.

Second suspension mechanism 100 also includes an air spring 140 having a first end 142 and a second end 144. First end 142 of air spring 140 is seated against a cradle 146. Cradle 146 is pivotably coupled to second suspension arm 102 at pivot point H. Second end 144 of air spring 140 is seated against a seating portion 82 slide frame 42. In a presently preferred embodiment, seating portion 82 of slide frame 42 includes two cross members 84.

Second suspension mechanism 100 also includes a first arm 152 and a second arm 162. A first end of first arm 152 is fixed to a cradle axle 148 of cradle 146 such that first arm 152 pivots about pivot point H. A first end of second arm 162 is fixed to a pivot axle 138 such that second arm 162 pivots about pivot point H. A link 172 having a first end and a second end is disposed between first arm 152 and second arm 162. As shown in FIG. 3, the first end of link 172 is pivotably coupled to first arm 152. The second end of link 172 is pivotably coupled to second arm 162.

Figure 4:
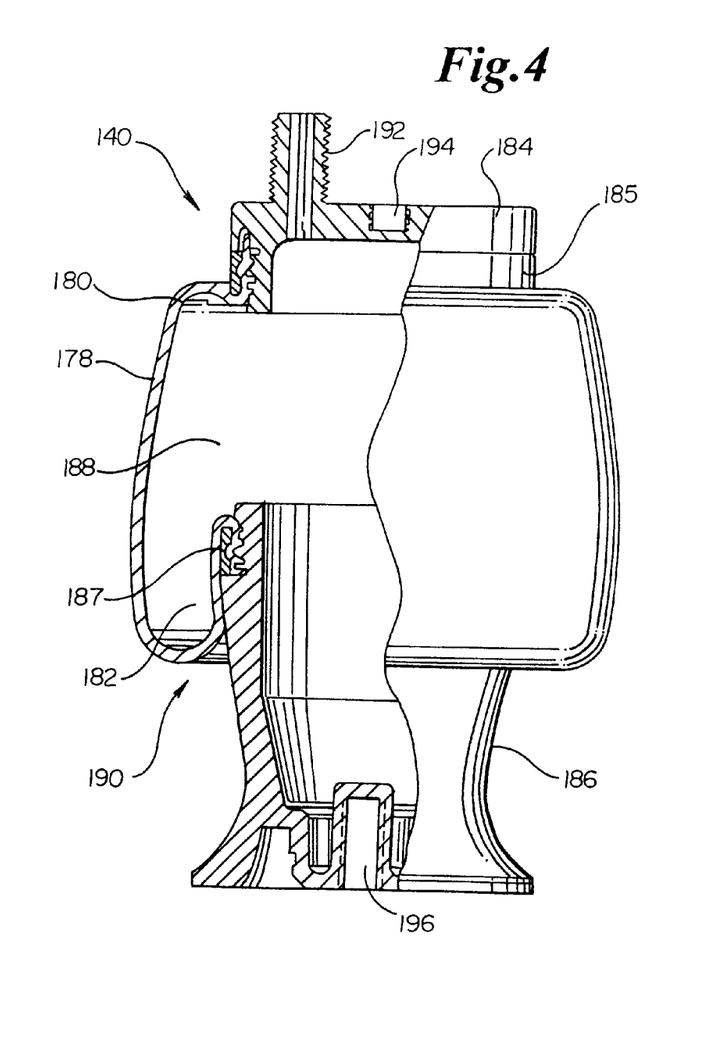
FIG. 4 is a partial cross sectional view of one embodiment of an air spring in accordance with the present invention.

FIG. 4 is a partial cross sectional view of one embodiment of an air spring 140. Air spring 140 includes a flexible sleeve 178 including a first end 180 and a second end 182. Flexible sleeve 178 consists of a flexible material, for example, rubber. First end 180 of flexible sleeve 178 is sealingly attached to a first end cap 184. In this embodiment, the seal between flexible sleeve 178 and first end cap 184 is maintained with an end cap clamping ring 185.

Second end 182 of flexible sleeve 178 is sealingly attached to a second end cap 186. The seal between flexible sleeve 178 and second end cap 186 is maintained with a piston clamping ring 187. With first end 180 and second end 182 sealed in the fashion described above, flexible sleeve 178 forms a fluid pressure chamber 188. In this embodiment, flexible sleeve 178 includes a roll 190 which allows air spring 140 to expand or contract in length.

Air spring 140 also includes a conduit connection 192 which allows a conduit such as a tube or a pipe to be placed in fluid connection with fluid pressure chamber 188 of air spring 140. In FIG. 4 conduit connection 192 is shown as a male pipe thread.

Those of skill in the art will appreciate that many general types of conduit connection are possible without deviating from the spirit and scope of the present invention. Examples of conduit connections which may be suitable in some applications include a male hose nipple, a male tube adapted to receive a compression fitting, or a female pipe thread. It should also be understood that air spring 140 would function equally well if fluid connection 192 was located on second end cap 186 rather than being located on first end cap 184.

First end cap 184 and second end cap 186 each include first mounting 194 and second mounting 196 respectively. First mounting 194 and second mounting 196 may be threaded holes as depicted in FIG. 4, or they may be another mounting means, for example, threaded studs or mounting brackets.

Figure 5:
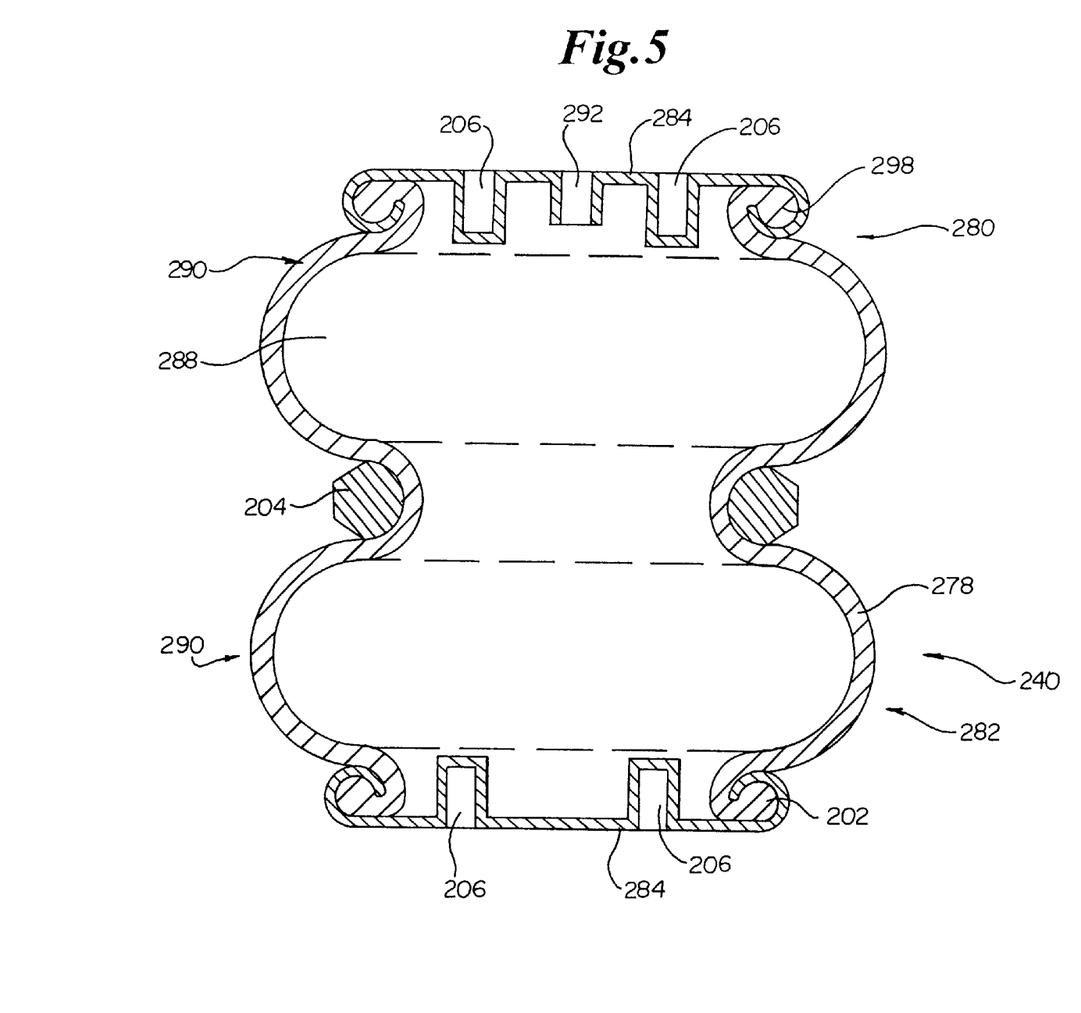
FIG. 5 is a cross sectional view of an additional embodiment of an air spring in accordance with the present invention.

FIG. 5 is a cross sectional view of an additional embodiment of an air spring 240. Air spring 240 includes a flexible sleeve 278 including a first end 280 and a second end 282. Flexible sleeve 278 includes a first bead 298 disposed proximate first end 282 and a second bead 202 disposed proximate second end 282. First end 280 of flexible sleeve 278 is sealingly attached to an end plate 284. Second end 282 of flexible sleeve 278 is also sealingly attached to an end plate 284.

Flexible sleeve 278 and end plates 284 combine to form a fluid pressure chamber 288. Flexible sleeve 278 includes a plurality of corrugations 290 and a girdle hoop 204. Corrugations 290 allow air spring 240 to expand and contract in length.

Air spring 240 also includes conduit connection 292 which allows a conduit such as a tube or a pipe to be placed in fluid connection with fluid pressure chamber 288 of air spring 240. In FIG. 5 conduit connection 292 is shown as a female pipe thread, however it should be understood that fluid connection 292 could be one of several means for attaching a fluid conduit which are well known in the art. For example, fluid connection 292 could be a male hose nipple, a male tube adapted to receive a compression fitting, or a male pipe thread. End plates 284 each include a plurality of blind nuts 206.

Air springs of the type shown in FIG. 4 and FIG. 5 are commercially available from Firestone Industrial Products Company (Carmel, Ind.) and Enidine Corporation (Orchard Park, N.Y.). During operation of snowmobile 20, the rear suspension is exposed to cold, wet, repeated shocks, vibration, dirt, and salt. Applicants have found that flexible walled air springs of this type are very durable when exposed to these types of adverse conditions.

Figure 6:
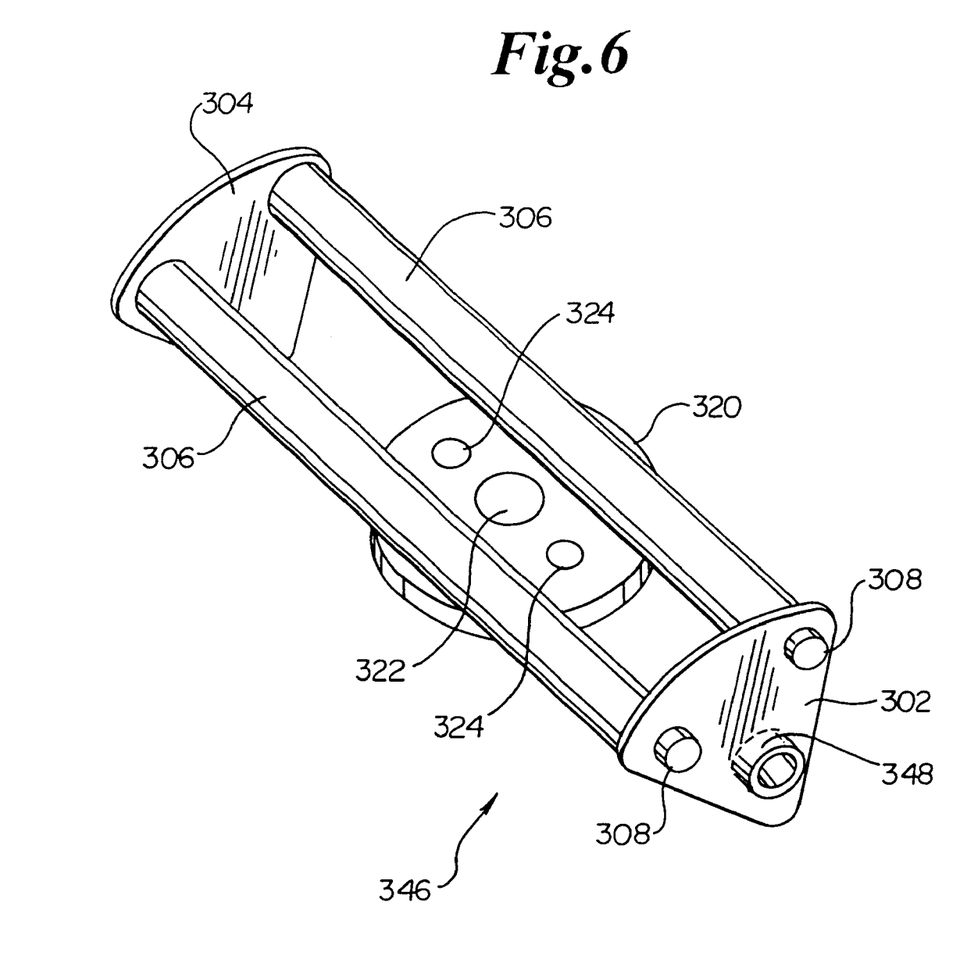
FIG. 6 is a perspective view of a cradle in accordance with the present invention.

FIG. 6 is a perspective view of a cradle 346 in accordance with the present invention. Cradle 346 includes a left flange 302 and a right flange 304. A pair of stringers 306 extend between left flange 302 and right flange 304. In the embodiment of FIG. 6 left flange 302 and right flange 304 are fixed to stringers 306 with fasteners 308. Those of skill in the art will appreciate that other methods may be utilized to fix right flange 304 and left flange 302 to stringers 306.

A left cradle axle 348 is fixed to left flange 302. Likewise, a right cradle axle (not shown) is fixed to right flange 304. An air spring mounting plate 320 is fixed to stringers 306. Air spring mounting plate 320 includes an aperture 322 and a plurality of holes 324. In a presently preferred embodiment, aperture 322 is adapted to allow a fitting or conduit to pass through mounting plate 320. Also in a presently preferred embodiment, holes 324 are adapted to accept fasteners which are utilized to fix an air spring to mounting plate 320.

Figure 7:
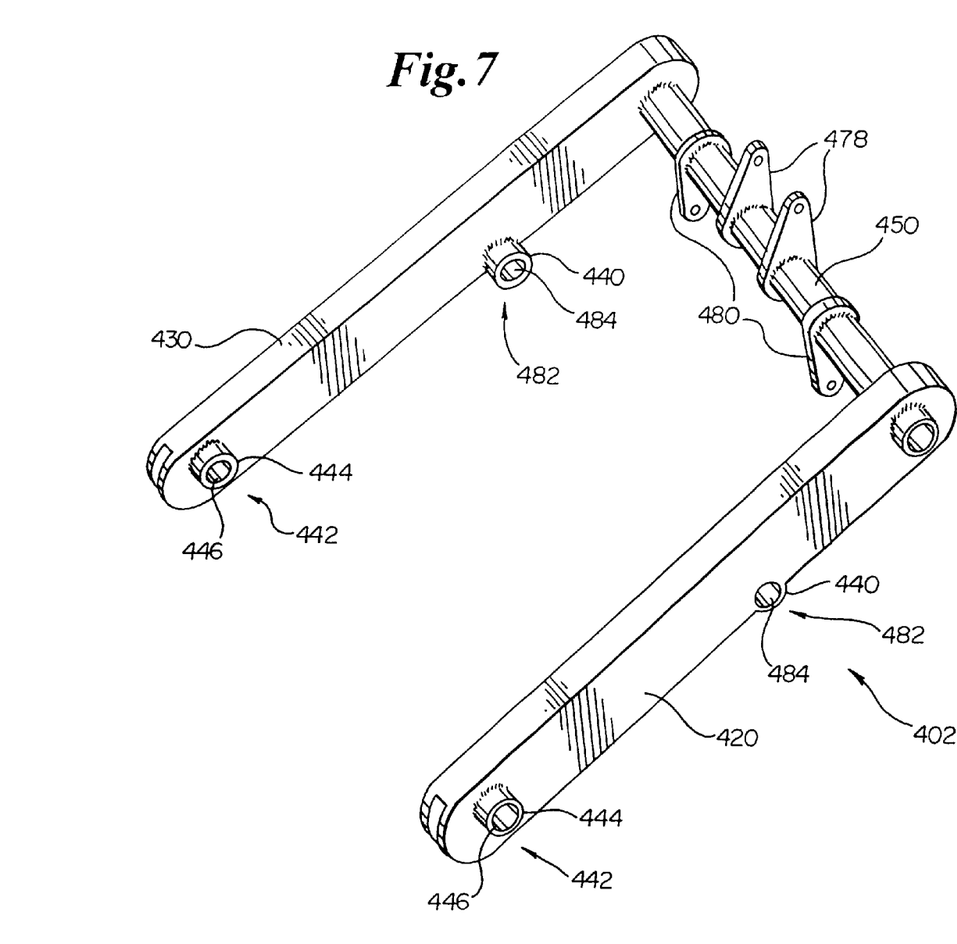
FIG. 7 is a perspective view of a suspension arm in accordance with the present invention.

FIG. 7 is a perspective view of a suspension arm 402 in accordance with the present invention. Suspension arm 402 includes a left arm 420 and a right arm 430. A generally tubular member 450 extends between left arm 420 and right arm 430. In the embodiment of FIG. 7, generally tubular member 450 is fixed to left arm 420 and right arm 430 by welding. Those of skill in the art will appreciate that other fixing methods may be utilized without deviating from the spirit and scope of the present invention. Examples of fixing methods which may be suitable in some applications include brazing, adhesive bonding, and the use of mechanical fasteners.

Two shock absorber mounting tangs 478 and two swing arm mounting tangs 480 are fixed to generally tubular member 450. Right arm 430 and left arm 420 each include a cradle pivot 482. In the embodiment of FIG. 7, each cradle pivot 482 includes a cradle pivot lumen 484 defined by a cradle bearing 440. Right arm 430 and left arm 420 each additionally include an arm bushing 442. In the embodiment of FIG. 7, each arm bushing includes a bushing body 444 defining a bushing lumen 446.

In a presently preferred embodiment suspension arm 402 is comprised of steel. Steel is readily available in a variety of shapes. Examples of shapes include square tubing, round tubing, and U-shaped channels. Those of skill in the art will appreciate that other materials may be used without deviating from the spirit and scope the present invention. Examples of materials which may be suitable in some applications include aluminum and composite materials comprising a plurality of reinforcing members imbedded in a resin material.

Figure 8:
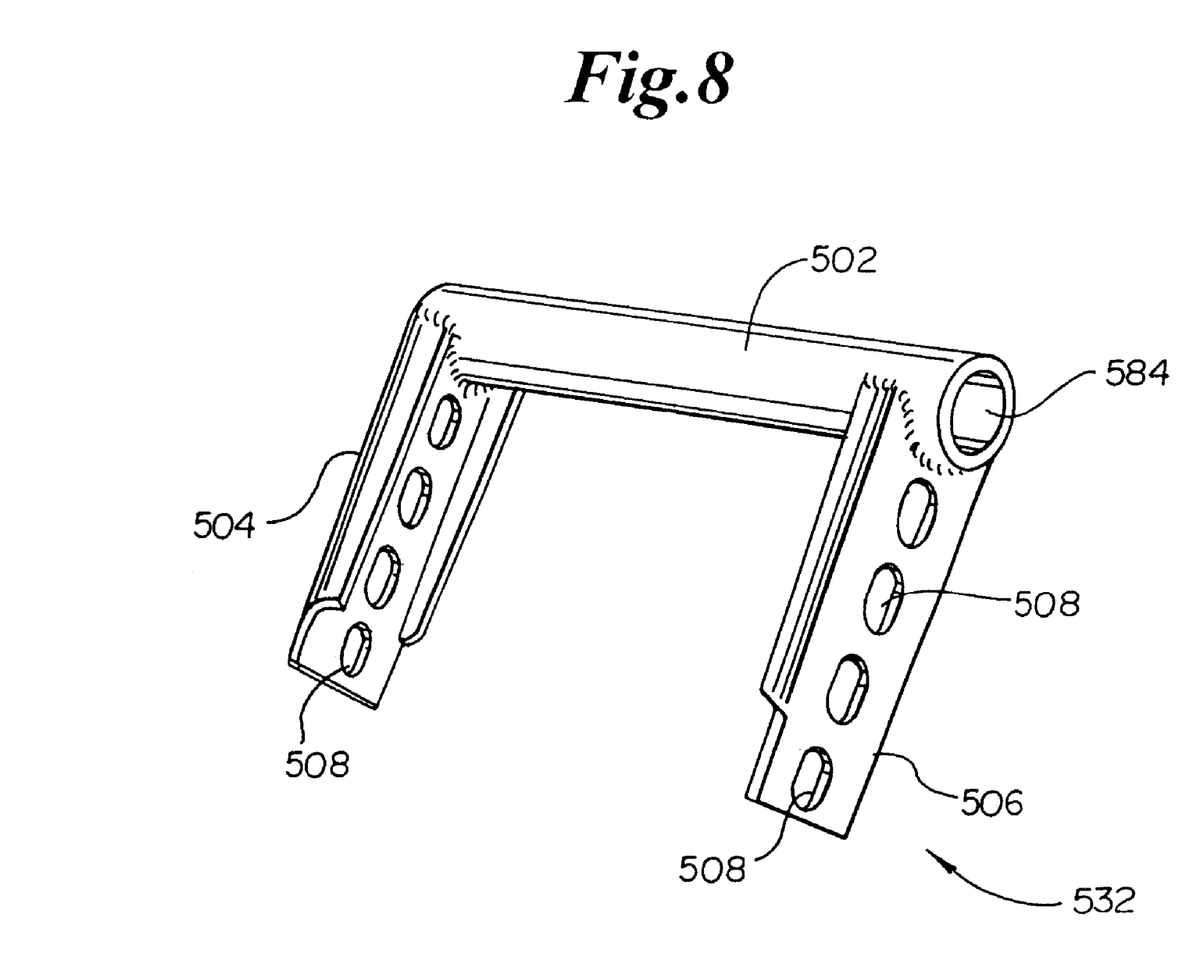
FIG. 8 is a perspective view of a pivot arm in accordance with the present invention.

FIG. 8 is a perspective view of a pivot arm 532 in accordance with the present invention. Pivot arm 532 comprises a tubular body 502 defining a pivot lumen 584. Pivot arm 532 also includes a right projection 504 and a left projection 506. In the embodiment of FIG. 8, right projection 504 and a left projection 506 are fixed to tubular body 502 by welding. Right projection 504 and a left projection 506 each define a plurality of openings 508. In a presently preferred embodiment, openings 508 are adapted to accept mechanical fasteners. Mechanical fasteners may be utilized to couple right projection 504 and a left projection 506 to other elements of a snowmobile suspension assembly. Examples of other elements of a snowmobile suspension assembly include extension arms, bearings, bushings, and slides.

Figure 9:
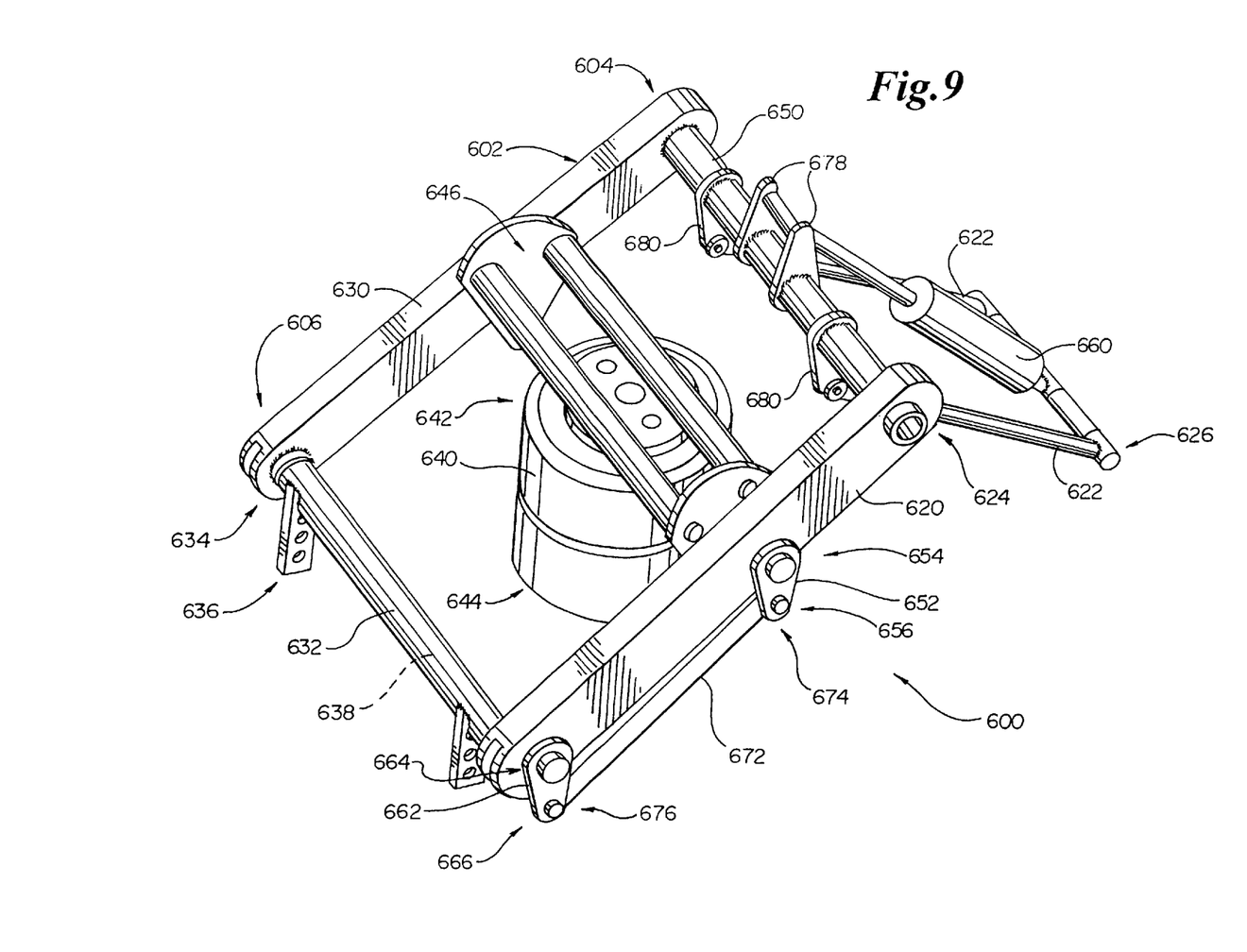
FIG. 9 is a perspective view of a suspension mechanism in accordance with the present invention.

FIG. 9 is a perspective view of a suspension mechanism 600 in accordance with the present invention. Suspension mechanism 600 comprises a suspension arm 602 which is adapted to be pivotably coupled to the chassis of a snowmobile proximate a first end 604 of suspension arm 602. A swing arm 622 having a first end 624 is pivotably coupled to suspension arm 602 proximate first end 604. A second end 626 of swing arm 622 is adapted to be pivotably coupled to a slide frame. A pivot arm 632 having a first end 634 is pivotably coupled to suspension arm 602 proximate a second end 606 thereof. Pivot arm 632 further includes a pivot axle 638 and a second end 636. Second end 636 of pivot arm 632 is adapted to be pivotably coupled to a slide frame.

Suspension mechanism 600 also includes an air spring 640 having a first end 642 and a second end 644. First end 642 of air spring 640 is seated against a cradle 646. Cradle 646 is pivotably coupled to suspension arm 602 between first end 604 and second end 606. When suspension mechanism 600 is coupled to a slide frame, second end 644 of air spring 640 may seat against a seating portion of the slide frame. A cradle axle 648 (not shown) is fixed to cradle 646.

Suspension mechanism 600 also includes a first arm 652 and a second arm 662. A first end 654 of first arm 652 is fixed to cradle axle 648. A first end 664 of second arm 662 is fixed to pivot axle 638. A link 672 having a first end 674 and a second end 676 is disposed between first arm 652 and second arm 662. As shown in FIG. 3, first end 674 of link 672 is pivotably coupled to first arm 652 proximate a second end 656 thereof. Second end 676 of link 672 is pivotably coupled to second arm 662 proximate a second end 666 thereof.

In a presently preferred embodiment, first arm 652, second arm 662, and link 672 cooperate to assure that first end 642 of air spring 640 remains generally parallel to second end 644 of air spring 640. This mechanism assures that air spring 640 will be loaded along it's longitudinal axis. This arrangement also dramatically reduces the likelihood that air spring 640 will buckle.

Suspension arm 602 of suspension mechanism 600 includes a left arm 620 and a right arm 630. A generally tubular member 650 extends between left arm 620 and right arm 630. Two shock absorber mounting tangs 678 and two swing arm mounting tangs 680 are fixed two generally tubular member 650. A swing arm 622 is pivotably coupled to each swing arm mounting tang 680. A shock absorber 660 is pivotably coupled to shock absorber mounting tangs 678.

In a presently preferred embodiment, air spring 640 serves to support at least some of the weight of a snowmobile. When the snowmobile encounters a bump air spring 640 may deflect. Air spring 640 and shock absorber 660 may both act to dampen the movement of the suspension mechanism. In a method in accordance with the present invention, the stiffness of suspension mechanism 600 may be adjusted by raising or lower the pressure of the fluid in the chamber of air spring 640.

Figure 10:
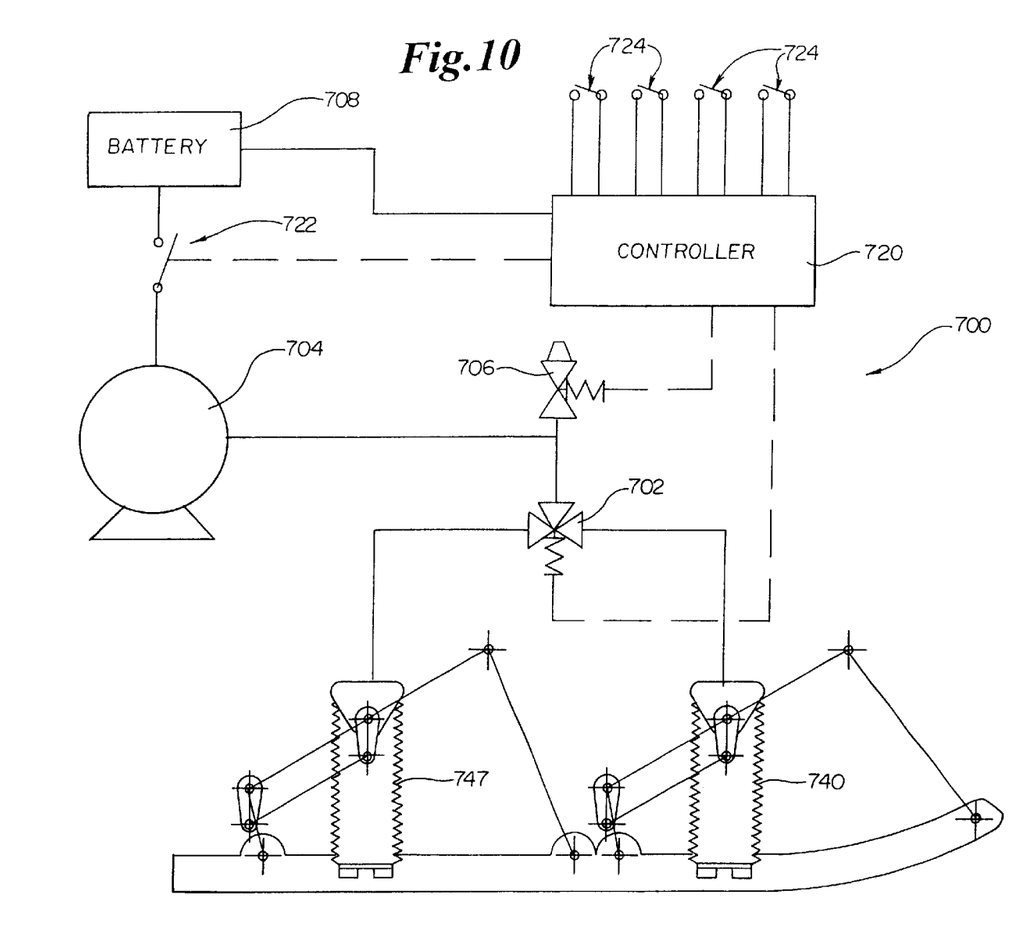
FIG. 10 is a schematic representation of a suspension system in accordance with the present invention.

FIG. 10 is a schematic representation of a suspension system 700 in accordance with the present invention. Suspension system 700 includes a front air spring 740 and a rear air spring 747. Front air spring 740 and rear air spring 747 are both coupled to a three way valve 702. Three way valve 702 is coupled to a compressor 704 and a venting valve 706.

Venting valve 706 and three way valve 702 are each coupled to a controller 720. Compressor 704 is coupled to a battery 708 via a relay 722. Relay 722 is also coupled to controller 720. In a presently preferred embodiment, controller 720 is adapted to selectively actuate venting valve 706, three way valve 702, and relay 722.

A plurality of switches 724 are coupled to controller 720. In a presently preferred embodiment switches 724 are disposed in a position which is readily accessible to a snowmobile operator. For example, switches 724 may be located on steering arrangement 50 or on control panel 52 of snowmobile 20 of FIG. 1.

The snowmobile operator may actuate one or more switches 724 to indicate to controller 720 that the pressure in front air spring 740 should be increased. Controller 720 may respond to the switch actuation(s) by actuating three way valve 702 so that front air spring 740 is in fluid communication with compressor 704. Controller 720 may also close relay 722 so that compressor begins pumping additional air into front air spring 740. The snowmobile operator may release switches 724 to stop the addition of air to front air spring 740. By adding air to the chamber of the front air spring, the snowmobile operator may selectively increase the stiffness of the front portion of the snowmobile suspension.

The snowmobile operator may also actuate one or more switches 724 to indicate to controller 720 that the pressure in front air spring 740 should be decreased. Controller 720 may respond to the switch actuation(s) by actuating three way valve 702 so that front air spring 740 is in fluid communication with venting valve 706. Controller 720 may also actuate venting valve 706 so that front air spring 740 is in fluid communication with ambient air. This will cause air from front air spring 740 to be vented. The snowmobile operator may stop the venting of air by releasing switches 724. By venting air from the chamber of the front air spring, the snowmobile operator may selectively decrease the stiffness of the front portion of the snowmobile suspension.

The snowmobile operator may actuate one or more switches 724 to indicate to controller 720 that the pressure in rear air spring 747 should be increased. Controller 720 may respond to the switch actuation(s) by actuating three way valve 702 so that rear air spring 747 is in fluid communication with compressor 704. Controller 720 may also close relay 722 so that compressor begins pumping additional air into rear air spring 747. The snowmobile operator may release switches 724 to stop the addition of air to rear air spring 747. By adding air to the chamber of the rear air spring, the snowmobile operator may selectively increase the stiffness of the rear portion of the snowmobile suspension.

The snowmobile operator may also actuate one or more switches 724 to indicate to controller 720 that the pressure in rear air spring 747 should be decreased. Controller 720 may respond to the switch actuation(s) by actuating three way valve 702 so that rear air spring 747 is in fluid communication with venting valve 706. Controller 720 may also actuate venting valve 706 so that rear air spring 747 is in fluid communication with ambient air. This will cause air from rear air spring 747 to be vented. The snowmobile operator may stop the venting of air by releasing switches 724. By venting air from the chamber of the rear air spring, the snowmobile operator may selectively decrease the stiffness of the rear portion of the snowmobile suspension.

In the embodiment of FIG. 10, battery 708 is adapted to supply electrical energy to compressor 704 and controller 720. Those of skill in the art will appreciate that many general types of batteries may be suitable for use in suspension system 700. Examples of batteries which may be suitable in some applications include a lead acid battery, a nickel-cadmium battery, and an alkaline battery. Battery 708 of snowmobile 20 in FIG. 7 may also be used to serve the function of battery 708.

Those of skill in the art will appreciate that many general types of compressors and/or air pumps may be suitable for use in suspension system 700. Compressors which may be suitable in some applications are commercially available from Gast Manufacturing Incorporated of Benton Harbor Mich., Thomas Industries of Sheboygan Wis., and Sensidyne Incorporated of Clearwater Fla.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A suspension mechanism for a vehicle comprising:
   a suspension arm having a first end and a second end;
   a cradle having a pivot point coupled to the suspension arm between the first end and the second end of the suspension arm;
   a slide frame having a first end and a second end;
   an air spring having a first end and a second end;
   the first end of the air spring seating against the cradle and extending above the pivot point of the cradle; and
   the second end of the air spring seating against a seating portion of the slide frame.

2. The suspension mechanism of claim 1, wherein the air spring is filled with a pressurized fluid.

3. The suspension mechanism of claim 1, wherein the seating portion of the slide frame includes at least one cross member.

4. The suspension mechanism of claim 1, wherein the air spring is filled with a pressurized fluid and the pressure of the fluid in the air spring is adjustable.

5. The suspension mechanism of claim 1, wherein said air spring includes a flexible sleeve.

6. The suspension mechanism of claim 1, further including a pressure source in fluid connection with said air spring.

7. The suspension mechanism of claim 6, wherein said pressure source is an air pump.

8. A suspension mechanism for a vehicle comprising:

a suspension arm having a first end and a second end;

a slide frame having a first end and a second end;

a pivot arm having a first end pivotably coupled to the suspension arm proximate the second end of the suspension arm;

the pivot arm further including a pivot axle and a second end;

the second end of the pivot arm being pivotably coupled to the slide frame;

a cradle having a pivot point coupled to the suspension arm between the first end and the second end of the suspension arm;

an air spring having a first end and a second end;

the first end of the air spring seating against the cradle and extending above the pivot point of the cradle;

the second end of the air spring seating against a seating portion of the slide frame;

a cradle axle fixed to the cradle;

a first arm fixed the cradle axle proximate a first end of the first arm;

a second arm fixed to the pivot axle proximate a first end of the second arm;

a link having a first end and a second end;

the first end of the link being pivotably coupled to the first arm proximate a second end of the first arm; and the second end of the link being pivotably coupled to the second arm proximate a second end of the second arm.

9. The suspension mechanism of claim 8, wherein the air spring is filled with a pressurized fluid.

10. The suspension mechanism of claim 8, wherein the seating portion of the slide frame includes at least one cross member.

11. The suspension mechanism of claim 8, wherein the air spring is filled with a pressurized fluid and the pressure of the fluid in the air spring is adjustable.

12. The suspension mechanism of claim 8, wherein said air spring includes a flexible sleeve.

13. The suspension mechanism of claim 8, further including a pressure source in fluid connection with said air spring.

14. The suspension mechanism of claim 13, wherein said pressure source is an air pump.

\* \* \* \* \*

UNITED STATES PATENT AND TRADEMARK OFFICE
CERTIFICATE OF CORRECTION

PATENT NO. : 6,502,651 B2
DATED : January 7, 2003
INVENTOR(S) : Jeffrey T. Zaczkowski et al.

It is certified that error appears in the above-identified patent and that said Letters Patent is hereby corrected as shown below:

<u>Title page,</u>
Insert Item [73],
-- [73] Assignee: Air-Link Performance LLC, Circle Pines, MN (US) --

Signed and Sealed this

Fifth Day of August, 2003

JAMES E. ROGAN
*Director of the United States Patent and Trademark Office*